United States Patent
Salkintzis

(10) Patent No.: US 11,943,135 B2
(45) Date of Patent: Mar. 26, 2024

(54) ESTABLISHING A NEW QOS FLOW FOR A DATA CONNECTION

(71) Applicant: Lenovo (Singapore) PTE. LTD., New Tech Park (SG)

(72) Inventor: Apostolis Salkintzis, Athens (GR)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/761,979

(22) PCT Filed: Sep. 18, 2019

(86) PCT No.: PCT/EP2019/074920
§ 371 (c)(1),
(2) Date: Mar. 18, 2022

(87) PCT Pub. No.: WO2021/052573
PCT Pub. Date: Mar. 25, 2021

(65) Prior Publication Data
US 2022/0393972 A1    Dec. 8, 2022

(51) Int. Cl.
*G06F 15/16*  (2006.01)
*H04L 45/00*  (2022.01)
*H04L 45/302* (2022.01)
*H04L 47/80*  (2022.01)

(52) U.S. Cl.
CPC .......... *H04L 45/3065* (2013.01); *H04L 45/38* (2013.01); *H04L 47/805* (2013.01)

(58) Field of Classification Search
CPC .............................. H04L 45/38; H04L 47/805
See application file for complete search history.

(56) References Cited

U.S. PATENT DOCUMENTS

| 11,463,929 | B2* | 10/2022 | Kim ................. | H04W 36/0022 |
| 2011/0222524 | A1* | 9/2011 | Thomson .......... | H04W 74/0816 370/339 |
| 2018/0167983 | A1* | 6/2018 | Salkintzis .......... | H04W 76/15 |

(Continued)

OTHER PUBLICATIONS

"Notification of Transmittal of the International Search Report and the Written Opinion of the International Searching Authority, or the Declaration", PCT, dated Apr. 20, 2020, pp. 1-16.

(Continued)

*Primary Examiner* — Hieu T Hoang
(74) *Attorney, Agent, or Firm* — Kunzler Bean & Adamson

(57) ABSTRACT

Apparatuses, methods, and systems are disclosed for modifying a data connection. One apparatus includes a processor, a first interface supporting a first data connection with a 5G core network over a first access and a second interface that communicates with a UE over a second access. The processor receives a request to establish a second data connection with the UE and determines whether the second data connection can be mapped into one of a plurality of QoS flows established over the first data connection. The processor sends a request to establish a new QoS flow over the first data connection upon determining that the second data connection cannot be mapped into an existing QoS flow of the first data connection and relays traffic between the second data connection and the new QoS flow over the first data connection.

20 Claims, 8 Drawing Sheets

(56) References Cited

U.S. PATENT DOCUMENTS

| | | | |
|---|---|---|---|
| 2019/0274178 A1* | 9/2019 | Salkintzis | H04W 76/16 |
| 2020/0128432 A1* | 4/2020 | Youn | H04W 28/10 |
| 2021/0014742 A1* | 1/2021 | Wang | H04W 36/14 |
| 2021/0306275 A1* | 9/2021 | Ke | H04W 28/0268 |
| 2022/0022089 A1* | 1/2022 | Zhu | H04W 28/0268 |
| 2022/0182861 A1* | 6/2022 | Youn | H04W 8/26 |
| 2022/0225438 A1* | 7/2022 | Suh | H04W 76/10 |
| 2023/0155943 A1* | 5/2023 | Yu | H04W 28/086 |
| | | | 709/224 |

OTHER PUBLICATIONS

Motorola Mobility et al., "Updates to Solution 8.7: Support stand-alone non-3GPP access via NG2/NG3", SA WG2 Meeting #118 S2-166380, Nov. 14-28, 2016, pp. 1-20.

* cited by examiner

ESTABLISHING A NEW QOS FLOW FOR A DATA CONNECTION

FIELD

The subject matter disclosed herein relates generally to wireless communications and more particularly relates to establishing a new QoS flow for a data connection.

BACKGROUND

The following abbreviations and acronyms are herewith defined, at least some of which are referred to within the following description.

Third Generation Partnership Project ("3GPP"), Fifth-Generation Core ("5GC"), Fifth-Generation QoS Indicator ("5QI"), Access and Mobility Management Function ("AMF"), Access Network Performance ("ANP"), Access Point Name ("APN"), Access Stratum ("AS"), Access Traffic Steering, Switching and Splitting ("ATSSS"), Allocation/Retention Policy ("ARP"), Application Programing Interface ("API"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Differentiated Services Code Point ("DSCP"), Downlink Control Information ("DCI"), Downlink ("DL"), Enhanced Clear Channel Assessment ("eCCA"), Enhanced Mobile Broadband ("eMBB"), Encapsulating Security Payload ("ESP"), Evolved Node-B ("eNB"), Evolved Packet Core ("EPC"), Evolved UMTS Terrestrial Radio Access Network ("E-UTRAN"), European Telecommunications Standards Institute ("ETSI"), Echo Acknowledgement Indicator ("EAI"), Request Indicator ("ERI", ERI-d refers to an ERI associated with a dummy payload and ERI-v refers to an ERI associated with a valid payload), Fixed Access Gateway Function ("FAGF"), Fixed Network Residential Gateway ("FN-RG"), Frame Based Equipment ("FBE"), Frequency Division Duplex ("FDD"), Frequency Division Multiple Access ("FDMA"), Generic Routing Encapsulation ("GRE"), Globally Unique Temporary UE Identity ("GUTI"), General Packet Radio Service ("GPRS"), GPRS Tunneling Protocol ("GTP", GTP-C refers to control signal tunneling while GTP-U refers to user data tunneling), Hybrid Automatic Repeat Request ("HARQ"), Home Subscriber Server ("HSS"), Internet-of-Things ("IoT"), IP Multimedia Subsystem ("IMS," aka "IP Multimedia Core Network Subsystem"), Internet Protocol ("IP"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Public Land Mobile Network ("PLMN"), Quality of Service ("QoS"), QoS Class Identifier ("QCI"), Quadrature Phase Shift Keying ("QPSK"), Registration Area ("RA"), Radio Access Network ("RAN"), Radio Access Technology ("RAT"), Radio Resource Control ("RRC"), Receive ("RX"), Reflective QoS Indicator ("RQI"), Single Network Slice Selection Assistance Information ("S-NSSAI"), Scheduling Request ("SR"), Secure User Plane Location ("SUPL"), Serving Gateway ("SGW"), Session Management Function ("SMF"), Stream Control Transmission Protocol ("SCTP"), System Information Block ("SIB"), Tracking Area ("TA"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmit ("TX"), Trusted WLAN Interworking Function ("TWIF"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), User Datagram Protocol ("UDP"), UE Route Selection Policy ("URSP"), Wireless Local Area Network ("WLAN"), Wireless Local Area Network Selection Policy ("WLANSP"), and Worldwide Interoperability for Microwave Access ("WiMAX").

A 5G-capable Residential Gateway ("5G-RG") may register with a 5G core network ("5GC") and provide services via the 5GC. Additionally, the 5G-RG may be capable of providing access to the 5GC to a UE that is operating "behind" the 5G-RG. Currently, based on the 3GPP Rel-16 specifications, the UE operating "behind" the 5G-RG can access the 5GC and can establish PDU Sessions, but these PDU Sessions are unable to fulfill strict QoS requirements.

BRIEF SUMMARY

Methods for modifying a data connection to support QoS requirements are disclosed. Apparatuses and systems also perform the functions of the methods.

One method for modifying a data connection to support QoS requirements includes supporting a first data connection with a 5G core network over a first access network, the first data connection supporting a plurality of quality of service ("QoS") flows. The method includes receiving a first request over a second access network, the first request containing a first set of parameters for establishing a second data connection with a remote unit over the second access network. The method includes determining whether the second data connection can be mapped into one of the plurality of QoS flows over the first data connection. The method includes sending a second request to establish a new QoS flow over the first data connection in response to determining that the second data connection cannot be mapped into one of the plurality of QoS flows over the first data connection, the second request containing a second set of parameters derived from the first set of parameters. The method includes relaying the data traffic between the second data connection and the new QoS flow over the first data connection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
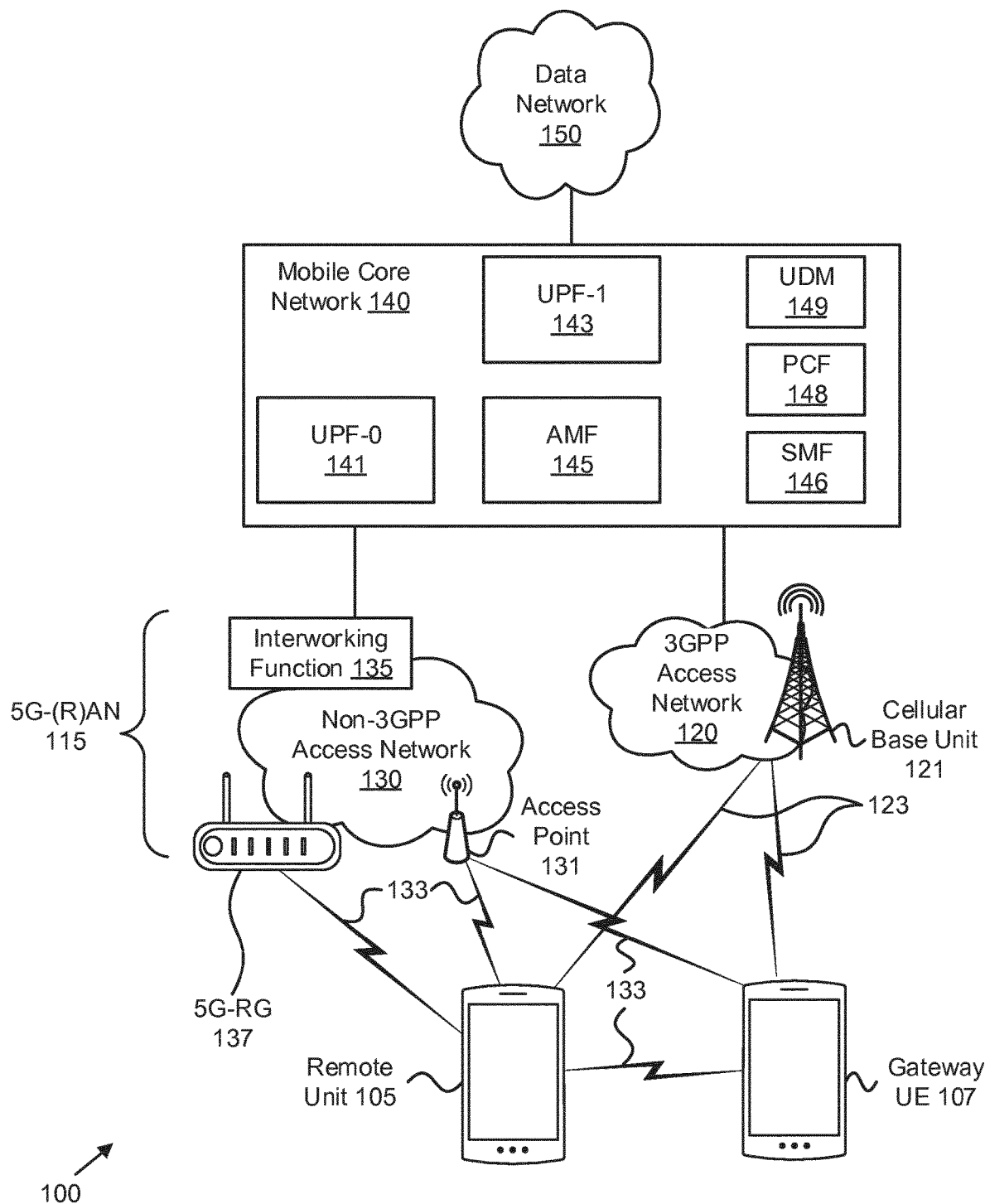
FIG. 1 is a schematic block diagram illustrating one embodiment of a wireless communication system for modifying a data connection to support QoS requirements.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for modifying a data connection to support QoS requirements. UEs operating "behind" a 5G-capable Residential Gateway (5G-RG) should be able to access the 5G core network and establish PDU Sessions capable to support strict QoS, e.g. to support guaranteed bitrate flows.

A problem with the current 5G-RGs and gateway UEs (e.g., operating according to current 3GPP Rel-16) is that the 5G-RG (or gateway UE) maps the data traffic (i.e. the IPsec SA traffic) of a UE operating behind the gateway (referred to as "UE-1") into one of its QoS flows without knowing the QoS requirements of this data traffic. This occurs because the PDU Session of UE-1 and the associated IPsec SA for UE-1 are established completely transparently to the 5G-RG (or gateway UE). In other words, the 5G-RG (or gateway UE) does not know that UE-1 has created its own PDU Session that requires specific QoS handling. Therefore, when the data traffic of UE-1 goes through the PDU Session of the 5G-RG, it is very likely that it does not receive the appropriate QoS handling. This means that it is not possible for the PDU Session of UE-1 to guarantee its assigned level of QoS, because the traffic of this PDU Session goes through the PDU Session of 5G-RG and can be mapped to a QoS flow of 5G-RG that does not support the appropriate QoS.

To resolve this problem, this disclosure proposes a solution that enables the 5G-RG (a) to map the IPsec traffic of UE-1 into a QoS flow that can meet the QoS requirements of this traffic, or (b) to create a new QoS flow that will carry the IPsec traffic of UE-1 and will be capable to offer the QoS for this traffic.

FIG. 1 depicts a wireless communication system 100 for modifying a data connection to support QoS requirements, according to embodiments of the disclosure. In one embodiment, the wireless communication system 100 includes at least one remote unit 105, at least one gateway UE 107, a 5G-RAN 115, a 5G-RG 137 and a mobile core network 140. The 5G-RAN 115 and the mobile core network form a mobile communication network. The 5G-RAN 115 may be composed of a 3GPP access network 120 containing at least one cellular base unit 121 and/or a non-3GPP access network 130 containing at least one access point 131. The gateway UE 107 may communicate with the 3GPP access network 120 using 3GPP communication links 123 and communicates with the non-3GPP access network 130 using non-3GPP communication links 133. In various embodiments, the remote unit 105 may communicate with the 3GPP access network 120 using 3GPP communication links 123, may communicate with the non-3GPP access network 130 using non-3GPP communication links 133, and/or may communicate with the 5G-RG 137 or the gateway UE 107, e.g., using non-3GPP communication links 133.

Even though a specific number of remote units 105, gateway UEs 107, 3GPP access networks 120, cellular base units 121, 3GPP communication links 123, non-3GPP access networks 130, access points 131, non-3GPP communication links 133, 5G-RG 137, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Additionally, the remote units 105 may communicate with the gateway UE 107 and/or the 5G-RG 137 via UL and DL communication signals carried over non-3GPP communication links 133. Here, the access networks 120 and 130 are intermediate networks that provide the remote units 105, gateway 107, and 5G-RG 137 with access to the mobile core network 140.

In some embodiments, the remote units 105 communicate with a remote host via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the 5G-RAN 115 (e.g., a 3GPP access network 120 and/or a non-3GPP access network 130). The mobile core network 140 then relays traffic between the remote unit 105 and the data network 150 using the PDU session. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data network and/or other remote hosts.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. In various embodiments, the non-3GPP access network 130 may comprise one or more wireless networks, for example WLAN(s). In certain embodiments, a non-3GPP access network 130 may serve a number of remote units 105 with a serving area of an access point 131. An access point 131 in a non-3GPP access network 130 may communicate directly with one or more remote units 105 by receiving wireless UL communication signals and transmitting wireless DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, the non-3GPP access network 130 may comprise one or more fixed wireline networks. Here, a fixed wireline non-3GPP access network 130 may connect to a 5G-RG 137. A 5G-RG 137 may connect to the mobile core network 140 via the fixed wireline network. Here, the 5G-RG 137 may register as a UE to the mobile core network 140 and thus establish data connections (e.g., PDU sessions) with the mobile core network 140. As such, the 5G-RG 137 supports 5G-NAS signaling and may establish a NAS layer connection with the AMF 145. Additionally, the 5G-RG 137 may connect to the remote unit 105 and serve as a gateway function by providing the remote unit 105 with access to the mobile core network 140. While depicted as connecting to the mobile core network 140 via a non-3GPP access network 130, in certain embodiments the 5G-RG 137 may connect to the mobile core network 140 using a fixed wireless connection via the 3GPP access network 120.

The gateway UE 107 may connect wirelessly to the mobile core network 140 via the 3GPP access network 120 and/or non-3GPP access network 130. Here, the gateway UE 107 may register as a UE to the mobile core network 140 and thus establish data connections (e.g., PDU sessions) with the mobile core network 140. Here, the gateway UE 107 establishes a NAS layer connection with the AMF 145. Additionally, the gateway UE 107 may connect (wirelessly) to the remote unit 105 and serve as a gateway function by providing the remote unit 105 with access to the mobile core network 140.

In some embodiments, a non-3GPP access network 130 connects to the mobile core network 140 via an interworking function 135. The interworking function 135 provides interworking between the remote unit 105 and the mobile core network 140. In some embodiments, the interworking function 135 is a Non-3GPP Interworking Function ("N3IWF") and, in other embodiments, it is a Trusted Non-3GPP Gateway Function ("TNGF"). The N3IWF supports the connection of "untrusted" non-3GPP access networks to the mobile core network (e.g. 5GC), whereas the TNGF supports the connection of "trusted" non-3GPP access networks to the mobile core network. The interworking function 135 supports connectivity to the mobile core network 140 via the "N2" and "N3" interfaces, and it relays "N1" signaling between the remote unit 105 and the AMF 145. As depicted, both the 3GPP access network 120 and the interworking function 135 communicate with the AMF 145 using a "N2" interface. The interworking function 135 also communicates with the UPF using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network.

In one embodiment, the mobile core network 140 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least a UPF-0 141 that serves the 5G-RG 137 (and/or gateway UE 107) and a UPF-1 143 that serves a remote unit 105. Note that in certain embodiments, the mobile core network may contain one or more intermediate UPFs, for example a first intermediate UPF that serves the non-3GPP access network 130 and the second intermediate UPF that serves the 3GPP access network 120. In such embodiments, there is an anchor UPF receiving UP traffic of the intermediate UPFs.

The mobile core network 140 also includes multiple control plane functions including, but not limited to, an Access and Mobility Management Function ("AMF") 145 that serves both the 3GPP access network 120 and the non-3GPP access network 130, a Session Management Function ("SMF") 146, a Policy Control Function ("PCF") 148, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like.

As depicted, a remote unit 105 (e.g., a UE) may connect to the mobile core network 140 (e.g., to a 5G mobile communication network) via the 5G-RG 137. Such a remote unit 105 is said to be operating "behind" the 5G-RG 137. Similarly, a remote unit 105 may connect to the mobile core network 140 via the gateway UE 107. Such a remote unit 105 is said to be operating "behind" the gateway UE 107.

In some embodiments, the 5G-RG 137 is able to modify its PDU Session with the 5G core network when a remote unit 105 operating behind the 5G-RG 137 requests specific QoS resources (e.g., an IEEE 802.11 Traffic Stream) over non-3GPP access. The modified PDU Session of the 5G-RG 137 supports a new QoS flow that is capable to transfer the traffic of the remote unit 105 to the 5G core network by providing the necessary QoS handling. Similarly, a gateway UE 107 may be configured to modify its PDU Session with the 5G core network when a remote unit 105 operating behind the gateway UE 107 requests specific QoS resources, such that the modified PDU session supports a new QoS flow that is capable to transfer the traffic of the remote unit 105 to the 5G core network by providing the necessary QoS handling.

Figure 2:
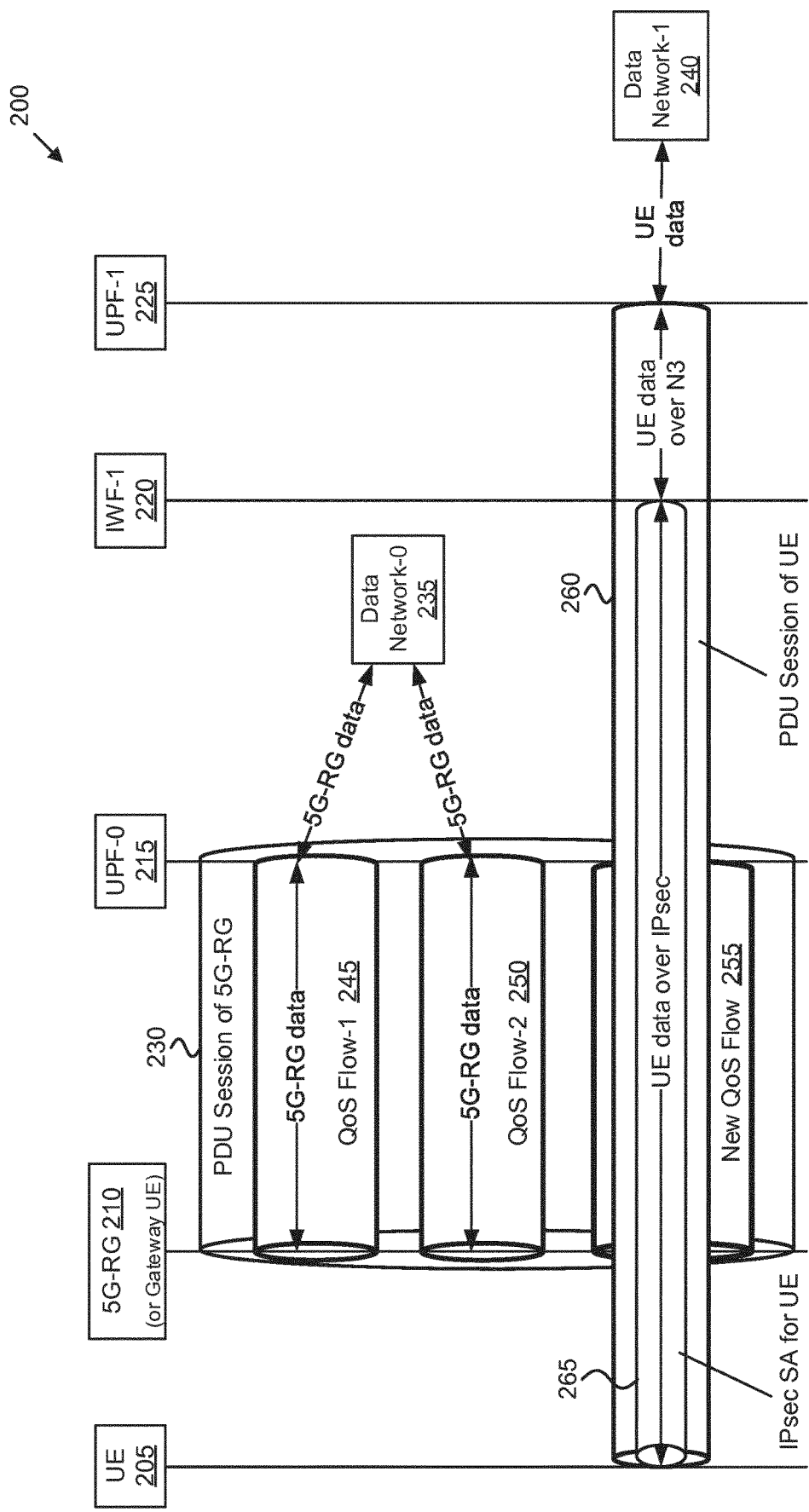
FIG. 2 is a block diagram illustrating one embodiment of a network architecture for a gateway supporting a PDU session for a UE.

FIG. 2 depicts a network architecture 200, according to embodiments of the disclosure. The network architecture 200 includes a UE 205 which is operating behind a gateway—here the 5G-RG 210, a UPF-0 215, an IWF-1 220 and UPF-1 225. The UE 205 may be one implementation of the remote unit 105, while the 5G-RG 210 may be one implementation of the 5G-RG 137. While the network architecture 200 depicts the UE 205 operating behind the 5G-RG 210, in other embodiments of the network architecture 200, the 5G-RG 210 is replaced with a gateway UE 107 (i.e., the UE 205 operates behind a gateway UE 107).

The 5G-RG 210 is registered with a 5G core network and has established a PDU Session 230 for communicating with Data Network-0 235, e.g. the Internet or an IPTV network offering TV channel streaming. The PDU Session 230 of 5G-RG is anchored at the UPF-0 215. Initially, the PDU Session 230 of the 5G-RG is composed of two QoS flows (QoS Flow-1 245 and QoS Flow-2 250), each one offering different QoS characteristics. The 5G-RG 210 is configured with QoS rules that map the uplink data traffic of the 5G-RG 210 to one of these QoS flows. Similarly, the UPF-0 215 is configured with N4 rules that map the downlink data traffic of the 5G-RG 210 to one of these QoS flows.

In addition, the UE 205 is registered with the 5G core network via the 5G-RG 210 and has established its own PDU Session 260 for communicating with Data Network-1 240, e.g. an enterprise network. Here, the PDU Session 260 of the UE 205 is anchored at UPF-1 225. In contrast to the 5G-RG 210, the data traffic of the UE 205 needs to go through a first Interworking function ("IWF-1") 220 (e.g., a TNGF or a N3IWF) before reaching the 5G core network. In various embodiments, this requirement is due to the UE 205 (as well as every UE operating "behind" a 5G-RG 210) accessing the 5G core by utilizing the solution for non-3GPP access, which requires a TNGF or N3IWF.

Note that all data traffic of the UE 205, i.e., all traffic sent via the PDU Session 260 of the UE 205, is carried over an IPsec Security Association (SA) 265 between the UE 205 and the IWF-1 220, which is established during the setup of the PDU Session 260 of the UE 205. This IPsec SA 265 carries all QoS flows of the UE 205 (which are different from the QoS flows of 5G-RG 210) and, hence, it should support specific QoS characteristics.

If no established QoS flow for the 5G-RG 210 supports the appropriate QoS, then the 5G-RG 210 creates a new QoS flow 255 that will carry the IPsec traffic of the UE 205. Here, the 5G-RG 210 establishes the new QoS flow 255, based on the QoS requirements associated with the IPsec traffic of the UE 205 and then maps the IPsec traffic of the UE 205 onto this new QoS flow 255. In this way, the IPsec traffic of the UE 205 receives the appropriate QoS handling when going through the PDU Session 230 of the 5G-RG 210. Creating a new QoS flow is discussed in greater detail below with reference to FIGS. 3A-3B.

In the general case, where the PDU Session 260 of the UE 205 is composed of multiple IPsec SAs, then the 5G-RG 210 may establish a new QoS flow for every IPsec SA. Alternatively, the 5G-RG 210 may establish a new QoS for some IPsec SAs and map the other IPsec SAs into existing QoS flows. For ease of illustration, only a single IPsec SA 265 is shown in FIG. 2.

Figure 3A:
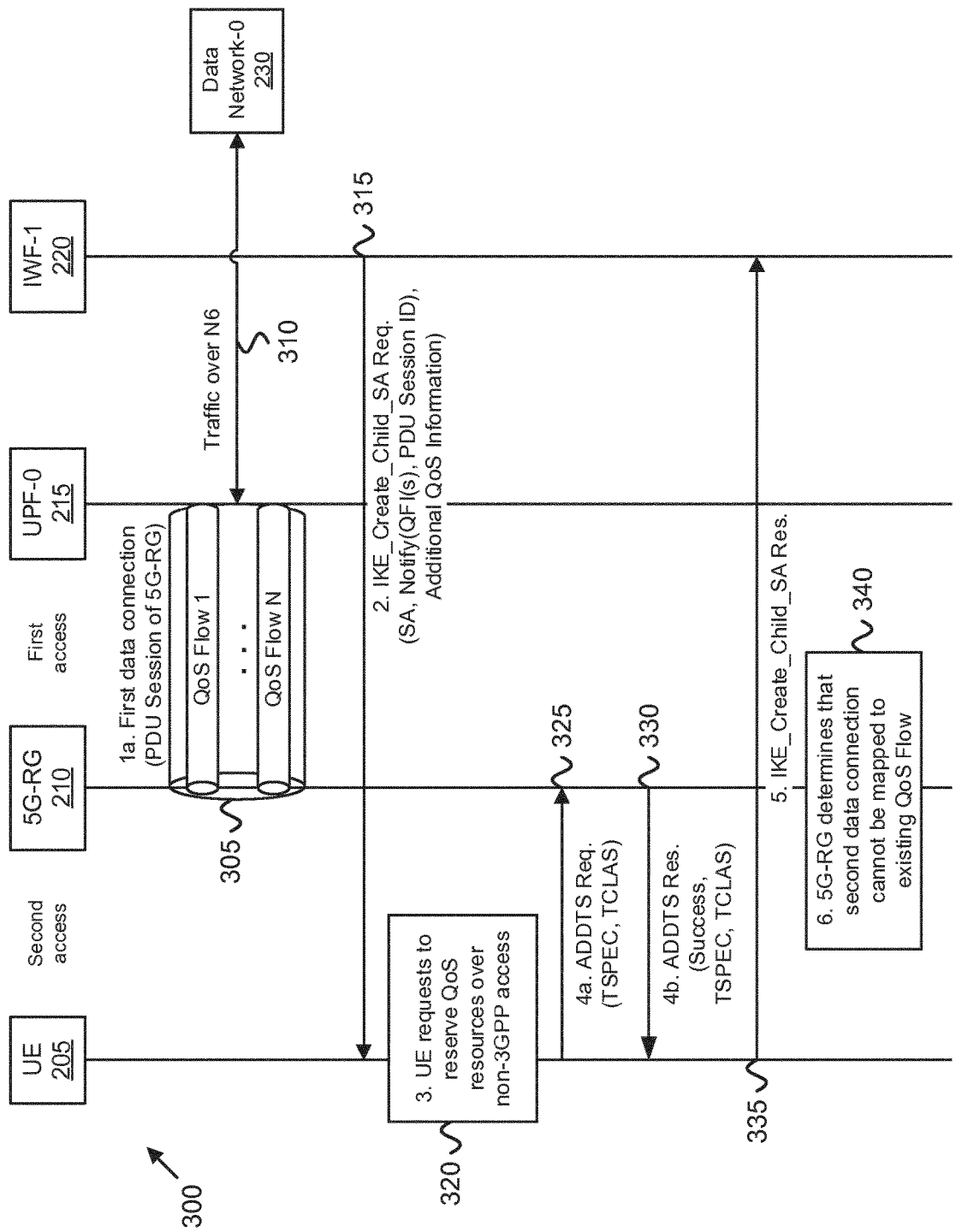
FIG. 3A is a block diagram illustrating one embodiment of a procedure for modifying a data connection to support QoS requirements.
Figure 3B:
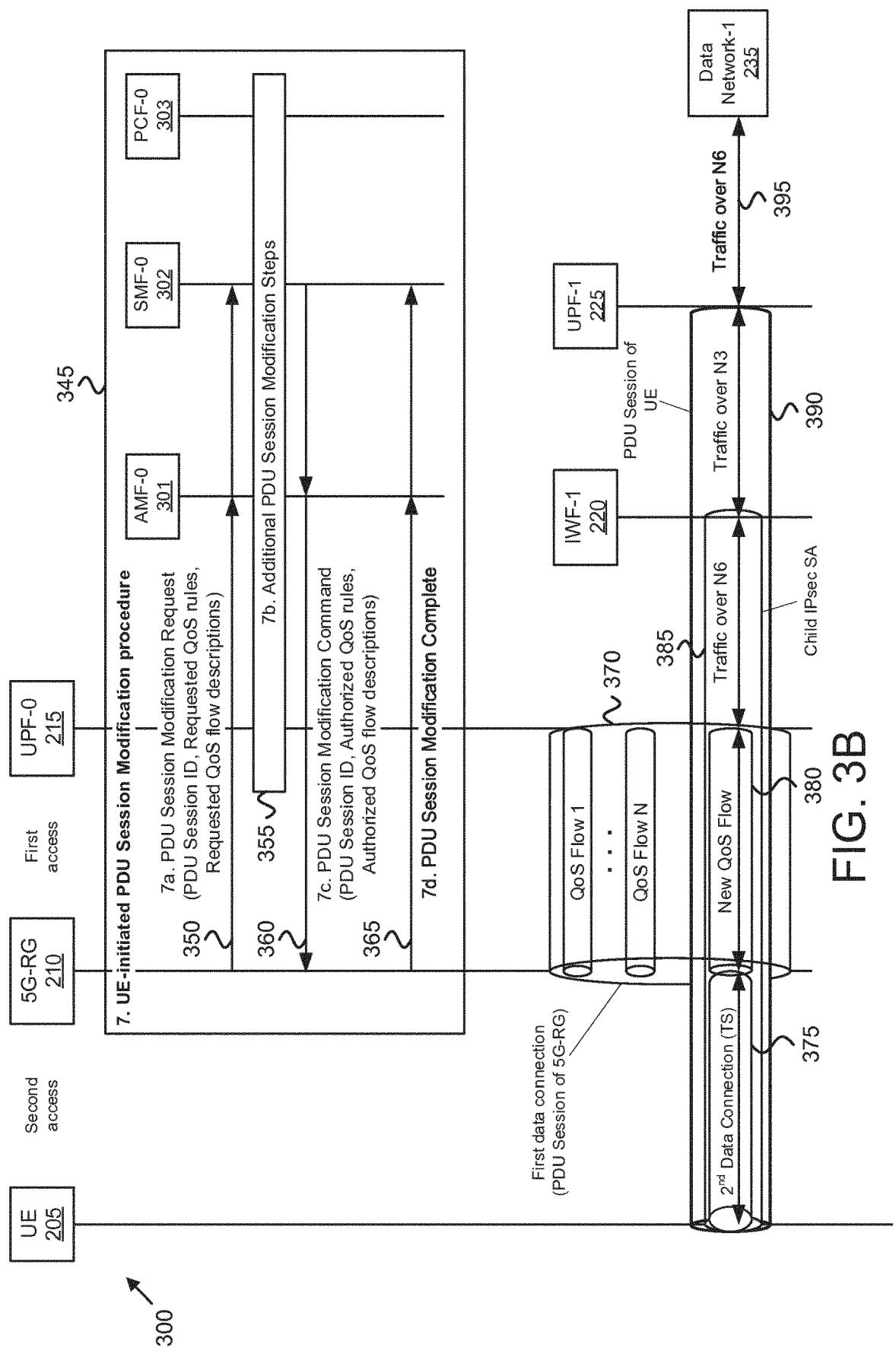
FIG. 3B is a continuation of the procedure depicted in FIG. 3A.

FIGS. 3A-3B depicts a network procedure 300 for modifying a data connection to support QoS requirements of an access network, according to embodiments of the disclosure. The network procedure 300 involves the UE 205, the 5G-RG 210, the UPF-0 215, the IWF-1 220, the UPF-1 225, an AMF-0 301, an SMF-0 302, and a PCF-0 303. The UE 205, the 5G-RG 210, the UPF-0 215, the IWF-1 220, and the UPF-1 225 are substantially as described above with reference to FIG. 2. The AMF-0 301 is an AMF serving the 5G-RG 210 and may be an implementation of the AMF 145. The SMF-0 302 is an SMF serving the 5G-RG 210 and may be an implementation of the SMF 146. The PCF-0 303 is a PCF serving the 5G-RG 210 and may be an implementation of the PCF 148.

In the network procedure 300, the 5G-RG 210 makes sure that the traffic over the child IPsec SA between UE 205 and IWF-1 220 is transferred via its PDU Session (first data connection) by receiving the appropriate QoS handling. In turn, this enables the UE 205 to establish a PDU Session (composed by one or more child IPsec SAs) via the 5G-RG 210 that can receive the expected QoS handling.

At FIG. 3A, the network procedure 300 begins at step 1 with the 5G-RG 210 having registered with a 5G core network, either via fixed wireless access, or via fixed wireline access (e.g., cable or xDSL), and has established a PDU Session 305 (first data connection) to the Data Network-0 235, e.g., the Internet or an IPTV network offering TV channel streaming. Note that the 5G network functions AMF-0 301, SMF-0 302, PCF-0 303, and UPF-0 215 have been allocated to support the 5G-RG 210 and its PDU Session 305. The PDU Session 305 supports one or more QoS flows, each one supporting certain QoS characteristics. The data traffic 310 of the 5G-RG 210 is carried via the PDU Session 305.

In addition, the UE 205 has connected to the 5G-RG 210 via non-3GPP access (e.g., Bluetooth, Wi-Fi, etc.) and has registered to the 5G core network via the 5G-RG 210. Here, such registration may be performed according to 3GPP specifications. The 5G network functions IWF-1 220 (e.g., a TNGF or N3IWF) and AMF-1 (not shown in the figure) are allocated to serve the UE 205. The UE 205 decides to establish a PDU Session in order to communicate with an external Data Network-1 240 (e.g., the Internet or a corporate data network). For this purpose, the UE 205 sends a PDU Session Establishment Request to the IWF-1 220 via the PDU Session 305 of the 5G-RG 210. The 5G network allocates a SMF-1 and UPF-1 to serve this PDU Session of the UE 205.

At step 2, as part of the UE 205 PDU Session Establishment procedure, the IWF-1 220 sends to the UE 205 a request to establish a child IPsec SA, which will carry one or more QoS flows of the PDU Session of the UE 205 (see messaging 315). Here, the request includes "Additional QoS Information" that indicates what QoS characteristics (e.g., max delay, mean and peak bitrates, etc.) are required for the traffic over this child IPsec SA.

At step 3, the UE 205 requests to reserve QoS resources over the non-3GPP access (between the UE 205 and the 5G-RG 210) in order to support the QoS requirements of the child IPsec SA (see block 320). For this purpose, the UE 205 requests from the 5G-RG 210 to establish a new Traffic Stream ("TS"), e.g., by sending an Add Traffic Stream ("ADDTS") Request as specified in the IEEE 802.11 specification (see messaging 325). The ADDTS includes the parameters TSPEC and TCLAS, a first set of parameters. It is assumed here that the non-3GPP access between the UE 205 and the 5G-RG 210 complies with IEEE 802.11. The TCLAS (Traffic Classification) element specifies the traffic that will be carried over the TS, e.g., by containing source and destination IP addresses and the Security Parameter Indexes (SPIs) of the child IPsec SA. The TSPEC (Traffic Specification) element specifies the QoS requirement of the TS, e.g., by containing the delay bound, min/mean/peak data rates, etc. The TSPEC element is populated based on the QoS requirements in the received "Additional QoS Information."

At step 4, after receiving the ADDTS Request containing TCLAS and TSPEC (first set of parameters), the 5G-RG 210 determines what QoS resources are required for the TS (e.g., based on TSPEC) and what traffic should be carried on the TS (e.g., based on TCLAS). If the 5G-RG 210 can satisfy the requested QoS reservation, it responds with an ADDTTS Response message and creates the associated Traffic Stream (TS) over non-3GPP access (see messaging 330). This TS will carry the traffic of the child IPsec SA between the UE 205 and the 5G-RG 210.

At step 5, after successfully establishing the TS with the 5G-RG 210 (e.g., reserving the QoS resources), the UE 205 accepts the child IPsec SA requested by the IWF-1 220 (see messaging 335). Note that signaling between the UE 205 and the IWF-1 220, including the PDU Session Establishment request/response and the IKE_Create_Child_SA request/response, is sent over a "signaling IPsec" tunnel, which is set up during the UE registration. This "signaling IPsec" tunnel goes through the PDU Session 305 of 5G-RG and thus through one of the existing QoS flows of the PDU Session 305.

At step 6 (refer to block 340), after successfully establishing the TS with the UE 205, the 5G-RG 210 determines if the traffic of this TS (second data connection) can be mapped into one of the existing QoS flows over its PDU Session 305 (first data connection). In various embodiments, this is determined by comparing the QoS characteristics of the TS (as defined by TSPEC) and the QoS characteristics of each existing QoS flow. If the traffic of the TS can be mapped into an existing QoS flow (called the matched QoS flow), then the 5G-RG 210 is configured to (a) forward the traffic arriving via the TS to the UPF-0 215 by using the matched QoS flow and (b) to forward the traffic arriving from the UPF-0 215 that matches the TCLAS (e.g., the downlink traffic of the child IPsec SA) to the TS by using the matched QoS flow.

Continuing at FIG. 3B, at step 7, if the traffic of the TS cannot be mapped into an existing QoS flow, then the 5G-RG 210 decides to modify its PDU Session 305 and request a new QoS flow. For this purpose, the 5G-RG 210 starts the UE-initiated PDU Session Modification procedure 345 by sending a PDU Session Modification Request including the Requested QoS Rules and the Requested QoS flow descriptions (see messaging 350).

The Requested QoS Rules specify the traffic that will be carried on the new QoS flow and is derived by using the TCLAS element received in step 3. In one example, the Requested QoS Rules will include one QoS rule with two packet filters: One that is used to detect the uplink traffic carried over the child IPsec SA (e.g., by means of an SPI and IP addresses) and another that is used to detect the downlink traffic carried over the child IPsec SA (e.g., again by means of an SPI and IP addresses). The Requested QoS flow descriptions specify the QoS characteristics of the requested QoS flow (e.g., guaranteed bitrates for uplink and downlink) and is derived by using the TSPEC element received in step 3. In one example, the Requested QoS flow descriptions will include two parameters: One for the guaranteed bitrate in the downlink direction and another for the guaranteed bitrate in the uplink direction.

Note that the UE-initiated PDU Session Modification procedure 345 may be performed according to 3GPP specifications. As such, there may be additional steps (see block 355) prior to the network functions sending a PDU Session Modification Command (see messaging 360). After the PDU Session modification is successfully completed (see messaging 365), the PDU Session of the 5G-RG 210 is modified to support a new QoS flow 380, which can meet the QoS requirements for the child IPsec SA 385 between the UE 205 and the IWF-1 220. In this way, the IPsec traffic of the UE's PDU Session 390 receives the appropriate QoS handling when going through the 5G-RG's modified PDU Session 370. In the general case, where the UE's PDU Session 390 is composed by multiple child IPsec SAs, the PDU Session Modification procedure at step 7 may create multiple new QoS flows in the PDU Session of 5G-RG 210. Each of these new QoS flows may be used to carry the traffic of a separate child IPsec SA.

The 5G-RG 210 is configured to (a) forward the traffic arriving via the TS 375 (second data connection) to the UPF-0 215 by using the new QoS flow 380 and (b) to forward the traffic 395 arriving from the UPF-0 215 that matches the TCLAS (e.g., the downlink traffic of the child IPsec SA 385) to the TS 375 by using the new QoS flow 380.

Figure 4:
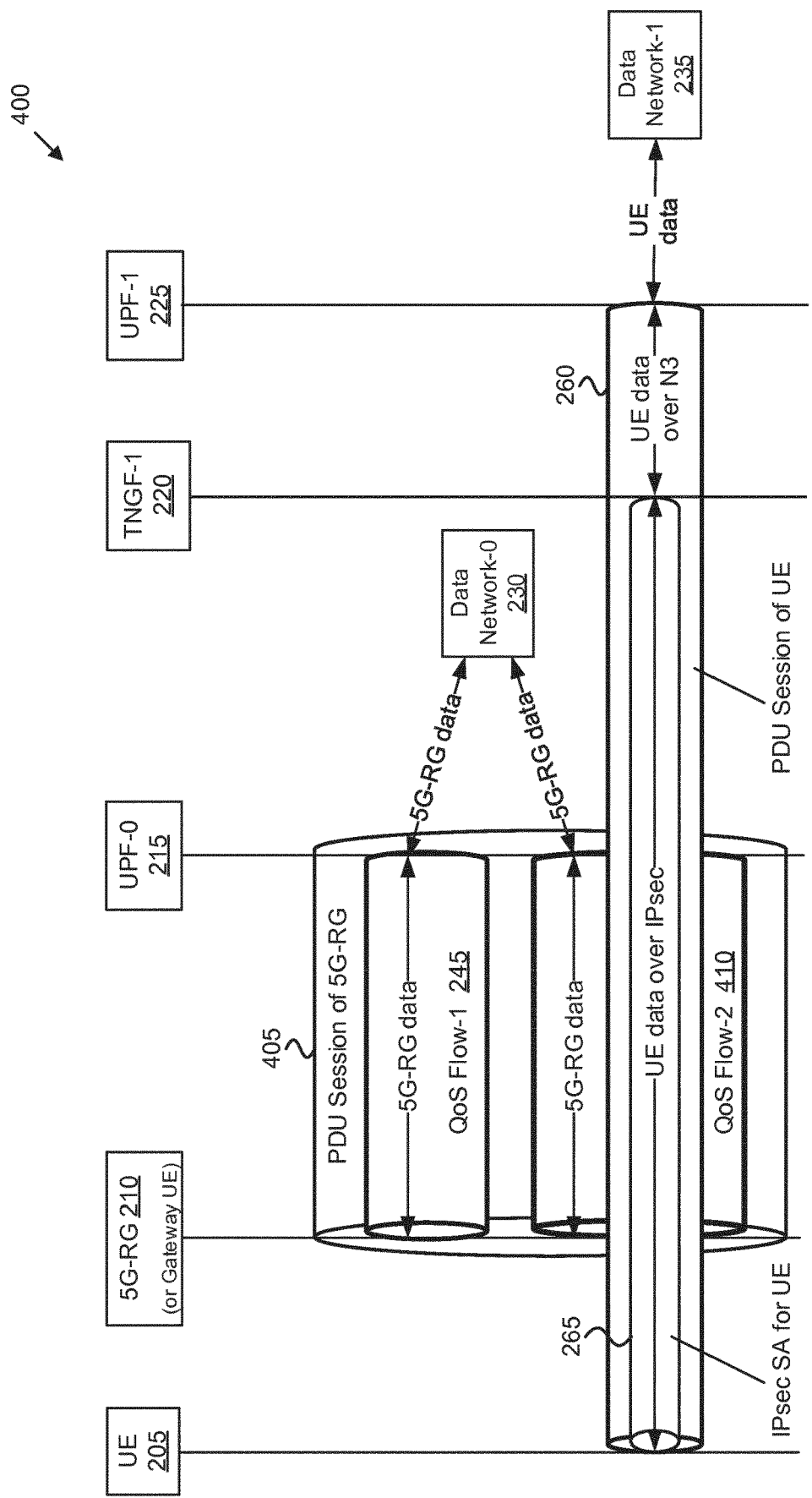
FIG. 4 is a block diagram illustrating another embodiment of a network architecture for a gateway supporting a PDU session for a UE.

FIG. 4 depicts a second network architecture 400, according to embodiments of the disclosure. Depicted are the UE 205 which is operating behind the 5G-RG 210. The 5G-RG 210 is registered with a 5G core network and has established a PDU Session 405 for communicating with Data Network-0 235. The PDU Session 405 of the 5G-RG 210 is anchored at the UPF-0 215 and is composed of two QoS flows (QoS Flow-1 245 and QoS Flow-2 410), each one offering different QoS characteristics.

The UE 205 is registered with the 5G core network via the 5G-RG 210 and has established its own PDU Session 260 for communicating with Data Network-1 240. Here, the PDU Session 260 of the UE 205 is anchored at UPF-1 225 and goes through the IWF-1 220 before reaching the 5G core network. Data traffic of the UE 205 mapped to the QoS Flow-2 410 is carried over an IPsec Security Association (SA) 265 between the UE 205 and the IWF-1 220, which is established during the setup of the PDU Session 260 of the UE 205. Note that if no established QoS flow for the 5G-RG 210 supports the appropriate QoS, then the 5G-RG 210 creates a new QoS flow to carry IPsec traffic of the UE 205. In various embodiments, the 5G-RG 210 may establish a new QoS flow for some IPsec SAs and map the other IPsec SAs into existing QoS flows. For ease of illustration, only a single IPsec SA is shown in FIG. 4.

As discussed above with reference to FIG. 3A, the UE 205 sends an ADDTS request to the 5G-RG 210 allowing the 5G-RG 210 to map the data traffic of the UE 205 (i.e. IPsec SA traffic) into an appropriate QoS flow of the PDU Session 405. Without knowing the QoS requirements of the data traffic of the UE 205, the 5G-RG 210 would be unable to perform the appropriate mapping. Rather, the 5G-RG 210 would blindly map the data traffic of the UE 205 into one of its QoS flows without knowing the QoS requirements of this data traffic. Therefore, it is very likely that the blindly mapped data traffic of the UE 205 would not receive the appropriate QoS handling as it goes through the PDU Session 405 of the 5G-RG 210 and thus it would not be possible for the PDU Session of the UE 205 to guarantee its assigned level of QoS.

Figure 5:
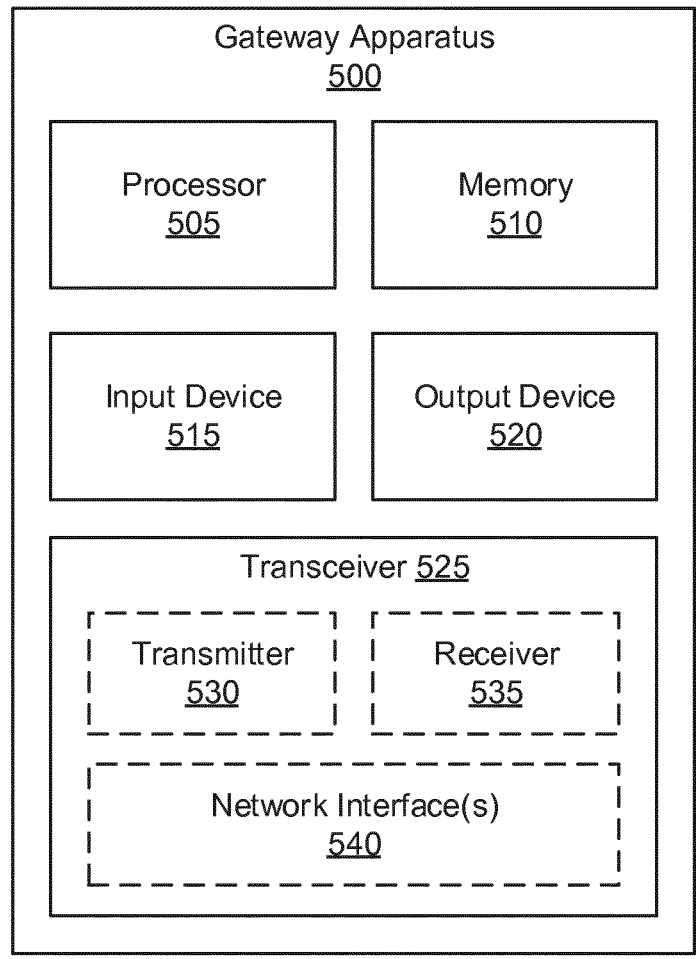
FIG. 5 is a schematic block diagram illustrating one embodiment of a gateway apparatus for modifying a data connection to support QoS requirements.

FIG. 5 depicts one embodiment of a gateway apparatus 500 that may be used for modifying a data connection to support QoS requirements, according to embodiments of the disclosure. The gateway apparatus 500 may be one embodiment of the 5G-RG 137, and/or the 5G-RG 210. Furthermore, gateway apparatus 500 may include a processor 505, a memory 510, an input device 515, an output device 520, a transceiver 525. In some embodiments, the input device 515 and the output device 520 are combined into a single device, such as a touch screen. In certain embodiments, the gateway apparatus 500 does not include any input device 515 and/or output device 520.

As depicted, the transceiver 525 includes at least one transmitter 530 and at least one receiver 535. Here, the transceiver 525 communicates with one or more remote units 105 and with one or more interworking functions 135 that provide access to one or more PLMNs Additionally, the transceiver 525 may support at least one network interface 540. For example, the transceiver 525 may support a first interface that supports a first data connection with a 5G core network over a first access network, the first data connection supporting a plurality of QoS flows, and a second interface that communicates with a remote unit over a second access network.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the first transceiver 525.

In various embodiments, the processor 505 receives a first request over the second access network and determines whether a requested second data connection can be mapped into one of the plurality of QoS flows over the first data connection. Here, the first request contains a first set of parameters for establishing a second data connection with the remote unit over the second access network.

In some embodiments, the first access network and the second access network utilize different access technologies, wherein the processor 505 further converts the first set of parameters into the second set of parameters. In some embodiments, the data traffic relayed between the second data connection and the new QoS flow over the first data connection is the data traffic of a child IPsec security association established between the remote unit and an Interworking function in the 5G core network.

For example, in certain embodiments the first request may be an ADDTS request and the first set of parameters may contain a TCLAS parameter and a TSPEC parameter. In such embodiments, the processor 505 may determine whether the second data connection can be mapped into one of the plurality of QoS flows over the first data connection by comparing the TSPEC parameter with QoS parameters associated with each of the plurality of QoS flows over the first data connection. In one embodiment, the processor 505 further converts the TCLAS parameter into a Requested QoS Rules parameter and the TSPEC parameter into a Requested QoS Flow Description parameter, wherein the Requested QoS Rules parameter and the Requested QoS Flow Description parameter are contained in the second set of parameters.

The processor 505 sends a second request to establish a new QoS flow over the first data connection in response to determining that the second data connection cannot be mapped into one of the plurality of QoS flows over the first data connection, the second request containing a second set of parameters derived from the first set of parameters and relays the data traffic between the second data connection and the new QoS flow over the first data connection. Additionally, the processor 505 may relay the data traffic between the second data connection and an existing one of the plurality of QoS flows over the first data connection in response to determining that the second data connection can be mapped to the existing one of the plurality of QoS flows over the first data connection.

In some embodiments, the second request may contain a request to modify the first data connection by creating a new QoS flow that supports the second set of parameters. In certain embodiments, the first data connection may be a PDU Session, wherein the second request contains a PDU Session Modification Request. In some embodiments, the first request indicates QoS resources to reserve over the second access network. In such embodiments, determining whether the second data connection can be mapped into one of the plurality of QoS flows over the first data connection includes comparing the QoS resources to reserve over the second access network with QoS parameters associated with each of the plurality of QoS flows over the first data connection.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to modifying a data connection to support QoS requirements, for example storing TCLAS parameters, TSPEC parameters, parameter conversion tables, IPsec security associations, and the like. In certain embodiments, the memory 510 also stores program code and related data, such as an operating system ("OS") or other controller algorithms operating on the gateway apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 may communicate with one or more remote units and/or with one or more interworking functions that provide access to one or more PLMNs. The transceiver 525 may also communicate with one or more network functions (e.g., in the mobile core network 140). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like. In one embodiment, the transceiver 525 implements multiple logical transceivers using different communication protocols or protocol stacks, while using common physical hardware.

Figure 6:
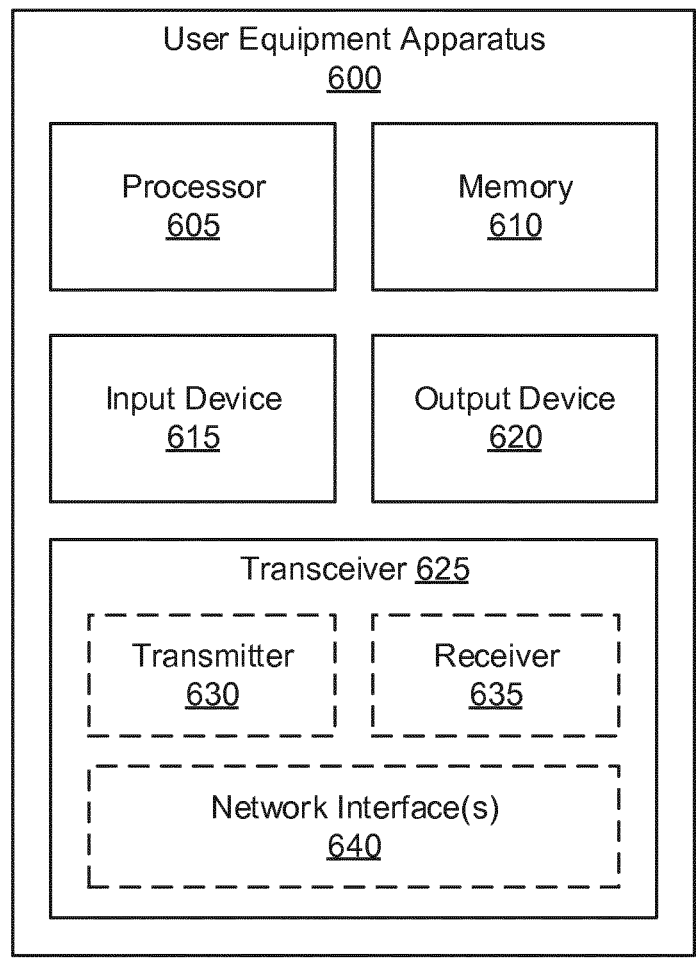
FIG. 6 is a schematic block diagram illustrating one embodiment of a user equipment apparatus for modifying a data connection to support QoS requirements.

FIG. 6 depicts one embodiment of a user equipment apparatus 600 that may be used for modifying a data connection to support QoS requirements, according to embodiments of the disclosure. The user equipment apparatus 600 may be one embodiment of the remote unit 105 and/or the gateway UE 107. Furthermore, the user equipment apparatus 600 may include a processor 605, a memory 610, an input device 615, an output device 620, a transceiver 625. In some embodiments, the input device 615 and the output device 620 are combined into a single device, such as a touch screen. In certain embodiments, the user equipment apparatus 600 does not include any input device 615 and/or output device 620.

As depicted, the transceiver 625 includes at least one transmitter 630 and at least one receiver 635. Here, the transceiver 625 communicates with a mobile core network (e.g., a 5GC) via an interworking function (e.g., TNGF or N3IWF) and over a non-3GPP access network. Additionally, the transceiver 625 may support at least one network interface 640. For example, when functioning as a gateway UE, the transceiver 625 may support a first interface that supports a first data connection with a 6G core network over a first access network, the first data connection supporting a plurality of QoS flows, and a second interface that communicates with a remote unit over a second access network.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, when functioning as a gateway UE, the processor 605 receives a first request over the second access network and determines whether a requested second data connection can be mapped into one of the plurality of QoS flows over the first data connection. Here, the first request contains a first set of parameters for establishing a second data connection with the remote unit over the second access network.

In some embodiments, the first access network and the second access network utilize different access technologies, wherein the processor 605 further converts the first set of parameters into the second set of parameters. In some embodiments, the data traffic relayed between the second data connection and the new QoS flow over the first data connection is the data traffic of a child IPsec security association established between the remote unit and an Interworking function in the 6G core network.

For example, in certain embodiments the first request may be an ADDTS request and the first set of parameters may contain a TCLAS parameter and a TSPEC parameter. In such embodiments, the processor 605 may determine whether the second data connection can be mapped into one of the plurality of QoS flows over the first data connection by comparing the TSPEC parameter with QoS parameters associated with each of the plurality of QoS flows over the first data connection. In one embodiment, the processor 605 further converts the TCLAS parameter into a Requested QoS Rules parameter and the TSPEC parameter into a Requested QoS Flow Description parameter, wherein the Requested QoS Rules parameter and the Requested QoS Flow Description parameter are contained in the second set of parameters.

The processor 605 sends a second request to establish a new QoS flow over the first data connection in response to determining that the second data connection cannot be mapped into one of the plurality of QoS flows over the first data connection, the second request containing a second set of parameters derived from the first set of parameters and relays the data traffic between the second data connection and the new QoS flow over the first data connection. Additionally, the processor 605 may relay the data traffic between the second data connection and an existing one of the plurality of QoS flows over the first data connection in response to determining that the second data connection can be mapped to the existing one of the plurality of QoS flows over the first data connection.

In some embodiments, the second request may contain a request to modify the first data connection by creating a new QoS flow that supports the second set of parameters. In certain embodiments, the first data connection may be a PDU Session, wherein the second request contains a PDU Session Modification Request. In some embodiments, the first request indicates QoS resources to reserve over the second access network. In such embodiments, determining whether the second data connection can be mapped into one of the plurality of QoS flows over the first data connection includes comparing the QoS resources to reserve over the second access network with QoS parameters associated with each of the plurality of QoS flows over the first data connection.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to modifying a data connection to support QoS requirements, for example storing TCLAS parameters, TSPEC parameters, parameter conversion tables, IPsec security associations, and the like. In certain embodiments, the memory 610 also stores program code and related data, such as an operating system ("OS") or other controller algorithms operating on the user equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
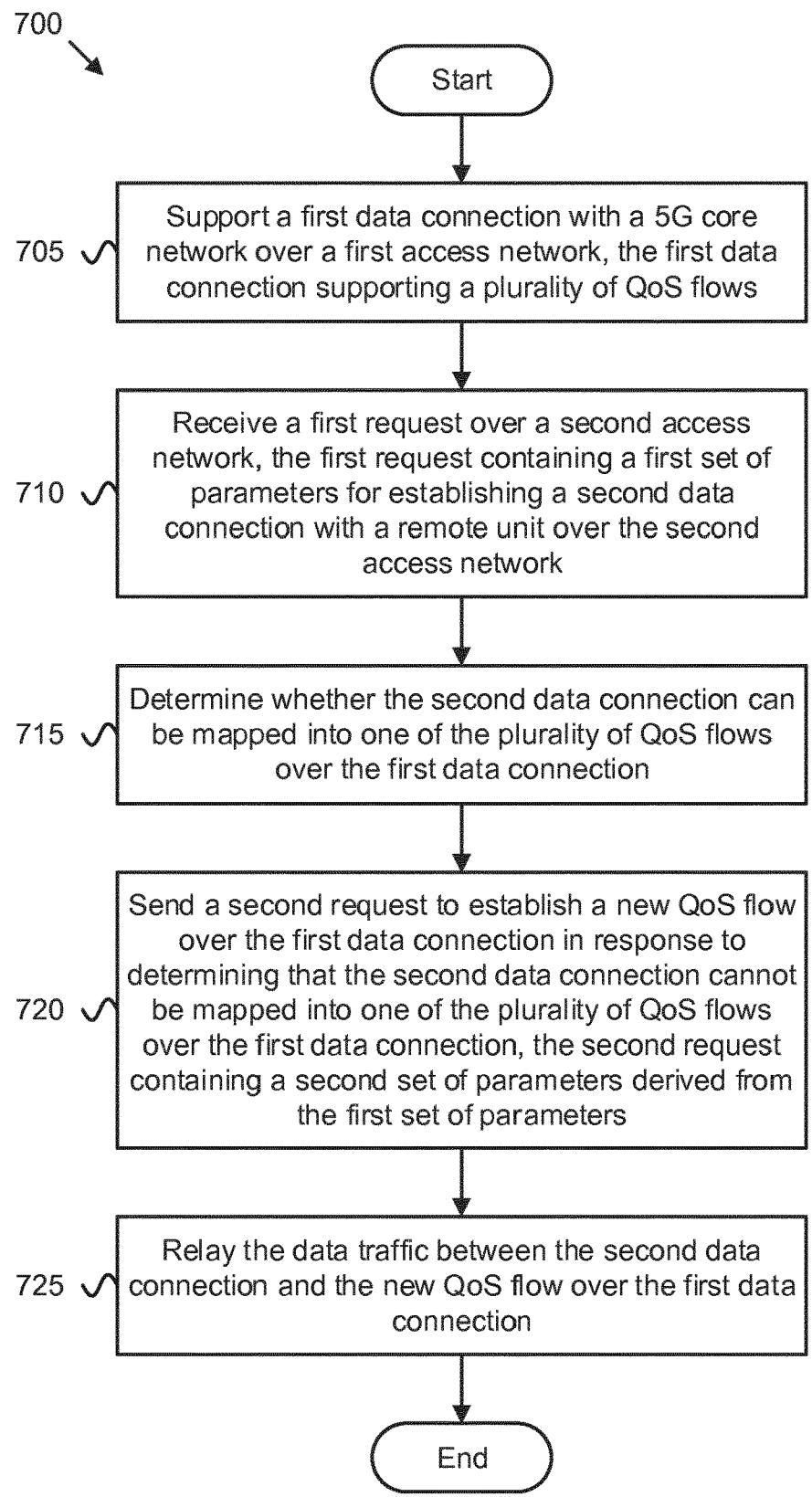
FIG. 7 is a flow chart diagram illustrating one embodiment of a method for modifying a data connection to support QoS requirements.

FIG. 7 depicts a method 700 for modifying a data connection to support QoS requirements, according to embodiments of the disclosure. In some embodiments, the method 700 is performed by a gateway device, such as the gateway UE 107, the 5G-RG 137, the 5G-RG 210, the gateway apparatus 500, and/or the user equipment apparatus 600. In certain embodiments, the method 700 may be performed by a processor executing program code, for example, a microcontroller, a microprocessor, a CPU, a GPU, an auxiliary processing unit, a FPGA, or the like.

The method 700 begins and supports 705 a first data connection with a 5G core network over a first access network. Here, the first data connection supports a plurality of QoS flows.

The method 700 includes receiving 710 a first request over a second access network. Here, the first request contains a first set of parameters for establishing a second data connection with a remote unit over the second access network. In some embodiments, the first request indicates QoS resources to reserve over the second access network. In some embodiments, the first access network and the second access network utilize different access technologies, thus the first set of parameters may require conversion into the second set of parameters.

The method 700 includes determining 715 whether the second data connection can be mapped into one of the plurality of QoS flows over the first data connection. In certain embodiments, determining whether the second data connection can be mapped into one of the plurality of QoS flows over the first data connection includes comparing QoS resources to reserve over the second access network with QoS parameters associated with each of the plurality of QoS flows over the first data connection.

In certain embodiments, the first request is an ADDTS request and the first set of parameters includes a TCLAS parameter and a TSPEC parameter. In such embodiments, determining whether the second data connection can be mapped into one of the plurality of QoS flows over the first data connection includes comparing the TSPEC parameter with QoS parameters associated with each of the plurality of QoS flows over the first data connection.

The method 700 includes sending 720 a second request to establish a new QoS flow over the first data connection in response to determining that the second data connection cannot be mapped into one of the plurality of QoS flows over the first data connection. Here, the second request contains a second set of parameters derived from the first set of parameters.

In some embodiments, the second request contains a request to modify the first data connection by creating a new QoS flow that supports the second set of parameters. In such embodiments, the first data connection may be a PDU Session, wherein the second request contains a PDU Session Modification Request.

The method 700 includes relaying 725 the data traffic between the second data connection and the new QoS flow over the first data connection. In some embodiments, the data traffic that is relayed between the second data connection and the new QoS flow over the first data connection is the data traffic of a child IPsec security association established between the remote unit and an Interworking function in the 5G core network. The method 700 ends.

Disclosed herein is a first apparatus for modifying a data connection to support QoS requirements, according to embodiments of the disclosure. The first apparatus may be implemented by a gateway device, such as the gateway UE 107, the 5G-RG 137, the 5G-RG 210, the gateway apparatus 500, and/or the user equipment apparatus 600. The first apparatus includes a processor, a first interface that supports a first data connection with a 5G core network over a first access network, the first data connection supporting a plurality of QoS flows, and a second interface that communicates with a remote unit over a second access network. The processor receives a first request over the second access network, the first request containing a first set of parameters for establishing a second data connection with the remote unit over the second access network. The processor determines whether the second data connection can be mapped into one of the plurality of QoS flows over the first data connection. The processor sends a second request to establish a new QoS flow over the first data connection in response to determining that the second data connection cannot be mapped into one of the plurality of QoS flows over the first data connection, the second request containing a second set of parameters derived from the first set of parameters and relays the data traffic between the second data connection and the new QoS flow over the first data connection.

In some embodiments, the processor relays the data traffic between the second data connection and an existing one of the plurality of QoS flows over the first data connection in response to determining that the second data connection can be mapped to the existing one of the plurality of QoS flows over the first data connection.

In some embodiments, the second request contains a request to modify the first data connection by creating a new QoS flow that supports the second set of parameters. In such embodiments, the first data connection may be a PDU Session, wherein the second request contains a PDU Session Modification Request. In some embodiments, the first request indicates QoS resources to reserve over the second access network. In such embodiments, determining whether the second data connection can be mapped into one of the plurality of QoS flows over the first data connection includes comparing the QoS resources to reserve over the second access network with QoS parameters associated with each of the plurality of QoS flows over the first data connection.

In certain embodiments, the first request is an ADDTS request and the first set of parameters contains a TCLAS parameter and a TSPEC parameter. In such embodiments, determining whether the second data connection can be mapped into one of the plurality of QoS flows over the first data connection may include comparing the TSPEC parameter with QoS parameters associated with each of the plurality of QoS flows over the first data connection. In one embodiment, the processor further converts the TCLAS parameter into a Requested QoS Rules parameter and the TSPEC parameter into a Requested QoS Flow Description parameter, wherein the Requested QoS Rules parameter and the Requested QoS Flow Description parameter are contained in the second set of parameters.

In some embodiments, the first access network and the second access network utilize different access technologies, wherein the processor further converts the first set of parameters into the second set of parameters. In some embodiments, the data traffic relayed between the second data connection and the new QoS flow over the first data connection is the data traffic of a child IPsec security association established between the remote unit and an Interworking function in the 5G core network.

Disclosed herein is a first method for modifying a data connection to support QoS requirements, according to embodiments of the disclosure. The first method may be performed by a gateway device, such as the gateway UE 107, the 5G-RG 137, the 5G-RG 210, the gateway apparatus 500, and/or the user equipment apparatus 600. The first method includes supporting a first data connection with a 5G core network over a first access network, the first data connection supporting a plurality of QoS flows. The first method includes receiving a first request over a second access network, the first request containing a first set of parameters for establishing a second data connection with a remote unit over the second access network. The first method includes determining whether the second data connection can be mapped into one of the plurality of QoS flows over the first data connection. The first method includes sending a second request to establish a new QoS flow over the first data connection in response to determining that the second data connection cannot be mapped into one of the plurality of QoS flows over the first data connection, the second request containing a second set of parameters derived from the first set of parameters. The first method includes relaying the data traffic between the second data connection and the new QoS flow over the first data connection.

In some embodiments, the first method further includes relaying the data traffic between the second data connection and an existing one of the plurality of QoS flows over the first data connection in response to determining that the second data connection can be mapped to the existing one of the plurality of QoS flows over the first data connection.

In some embodiments, the second request contains a request to modify the first data connection by creating a new QoS flow that supports the second set of parameters. In such embodiments, the first data connection may be a PDU Session, wherein the second request contains a PDU Session Modification Request.

In some embodiments, the first request includes QoS resources to reserve over the second access network. In certain embodiments, determining whether the second data connection can be mapped into one of the plurality of QoS flows over the first data connection includes comparing the QoS resources to reserve over the second access network with QoS parameters associated with each of the plurality of QoS flows over the first data connection.

In certain embodiments, the first request is an ADDTS request and the first set of parameters contains a TCLAS parameter and a TSPEC parameter. In such embodiments, determining whether the second data connection can be mapped into one of the plurality of QoS flows over the first data connection includes comparing the TSPEC parameter with QoS parameters associated with each of the plurality of QoS flows over the first data connection. In some embodiments, the first method may further include converting the TCLAS parameter into a Requested QoS Rules parameter and the TSPEC parameter into a Requested QoS Flow Description parameter, wherein the Requested QoS Rules parameter and the Requested QoS Flow Description parameter are contained in the second set of parameters.

In some embodiments, the first access network and the second access network utilize different access technologies. In such embodiments, the first method may further include converting the first set of parameters into the second set of parameters. In some embodiments, the data traffic relayed between the second data connection and the new QoS flow over the first data connection is the data traffic of a child IPsec security association established between the remote unit and an Interworking function in the 5G core network.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A gateway apparatus comprising:
at least one memory; and
at least one processor coupled with the at least one memory and configured to cause the gateway apparatus to:
support a first data connection between the gateway apparatus and a user plane function (UPF) in a fifth generation (5G) core network, the first data connection supporting a plurality of quality of service (QoS) flows over a first access network;
receive a first request from a user equipment (UE) and over a second access network, the first request containing a first set of parameters for establishing a second data connection with the UE over the second access network;
determine whether the second data connection can be mapped to one of the plurality of QoS flows over the first data connection;
send a second request to establish a QoS flow over the first data connection in response to determining that the second data connection cannot be mapped to one of the plurality of QoS flows over the first data connection, the second request containing a second set of parameters derived from the first set of parameters; and
relay data traffic between the second data connection and the new QoS flow over the first data connection.

2. The gateway apparatus of claim 1, wherein the at least one processor is further configured to cause the gateway apparatus to relay the data traffic between the second data connection and at least one QoS flow of the plurality of QoS flows over the first data connection in response to determining that the second data connection can be mapped to the at least one QoS flow.

3. The gateway apparatus of claim 1, wherein the second request comprises a request to modify the first data connection by creating the QoS flow that supports the second set of parameters.

4. The gateway apparatus of claim 3, wherein the first data connection comprises a Packet Data Unit (PDU) Session, and wherein the second request comprises a PDU Session Modification Request.

5. The gateway apparatus of claim 1, wherein the first request comprises a request for one or more QoS resources to reserve over the second access network.

6. The gateway apparatus of claim 5, wherein to determine whether the second data connection can be mapped to one of the plurality of QoS flows over the first data connection, the at least one processor is configured to cause the gateway apparatus to compare the one or more QoS resources with one or more QoS parameters associated with each of the plurality of QoS flows over the first data connection.

7. The gateway apparatus of claim 5, wherein the first request is an Add Traffic Stream (ADDTS) request, and wherein the first set of parameters includes a Traffic Classification (TCLAS) parameter and a Traffic Specification (TSPEC) parameter.

8. The gateway apparatus of claim 7, wherein to determine whether the second data connection can be mapped to one of the plurality of QoS flows over the first data connection, the at least one processor is configured to cause the gateway apparatus to compare the TSPEC parameter with one or more QoS parameters associated with each of the plurality of QoS flows over the first data connection.

9. The gateway apparatus of claim 7, wherein the at least one processor is further configured to cause the gateway apparatus to convert the TCLAS parameter into a Requested QoS Rules parameter and the TSPEC parameter into a Requested QoS Flow Description parameter, and wherein the Requested QoS Rules parameter and the Requested QoS Flow Description parameter are contained in the second set of parameters.

10. The gateway apparatus of claim 1, wherein the first access network and the second access network relate to different access technologies, and wherein the at least one processor is further configured to cause the gateway apparatus to convert the first set of parameters into the second set of parameters.

11. The gateway apparatus of claim 1, wherein the data traffic relayed between the second data connection and the QoS flow over the first data connection is the data traffic of a child Internet Protocol Security (IPsec) security association established between the UE and an Interworking function in the 5G core network.

12. A method performed by a gateway device, the method comprising:
supporting a first data connection between the gateway device and a user plane function (UPF) in a fifth generation (5G) core network over a first access network, the first data connection supporting a plurality of quality of service (QoS) flows;
receiving a first request from a user equipment (UE) and over a second access network, the first request containing a first set of parameters for establishing a second data connection with the UE over the second access network;
determining whether the second data connection can be mapped to one of the plurality of QoS flows over the first data connection;
sending a second request to establish a QoS flow over the first data connection in response to determining that the second data connection cannot be mapped to one of the plurality of QoS flows over the first data connection, the second request containing a second set of parameters derived from the first set of parameters; and
relaying the data traffic between the second data connection and the new QoS flow over the first data connection.

13. The method of claim 12, further comprising relaying the data traffic between the second data connection and at least one QoS flow of the plurality of QoS flows over the first data connection in response to determining that the second data connection can be mapped to the at least one QoS flow.

14. The method of claim 12, wherein the second request comprises a request to modify the first data connection by creating the QoS flow that supports the second set of parameters.

15. The method of claim 14, wherein the first data connection comprises a Packet Data Unit (PDU) Session, and wherein the second request comprises a PDU Session Modification Request.

16. The method of claim 12, wherein the first request comprises a request for one or more QoS resources to reserve over the second access network.

17. The method of claim 16, wherein determining whether the second data connection can be mapped to one of the plurality of QoS flows over the first data connection comprises comparing the one or more QoS resources with one or more QoS parameters associated with each of the plurality of QoS flows over the first data connection.

18. The method of claim 16, wherein the first request is an Add Traffic Stream (ADDTS) request, and wherein the first set of parameters includes a Traffic Classification (TCLAS) parameter and a Traffic Specification (TSPEC) parameter.

19. The method of claim 18, wherein determining whether the second data connection can be mapped to one of the plurality of QoS flows over the first data connection comprises comparing the TSPEC parameter with one or more QoS parameters associated with each of the plurality of QoS flows over the first data connection.

20. The method of claim 18, further comprising converting the TCLAS parameter into a Requested QoS Rules parameter and the TSPEC parameter into a Requested QoS Flow Description parameter, and wherein the Requested QoS Rules parameter and the Requested QoS Flow Description parameter are contained in the second set of parameters.

* * * * *